US008108359B1

(12) United States Patent
Cooley et al.

(10) Patent No.: US 8,108,359 B1
(45) Date of Patent: Jan. 31, 2012

(54) METHODS AND SYSTEMS FOR TAG-BASED OBJECT MANAGEMENT

(75) Inventors: Shaun Cooley, El Segundo, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 581 days.

(21) Appl. No.: 11/956,608

(22) Filed: Dec. 14, 2007

(51) Int. Cl.
 *G06F 17/00* (2006.01)
(52) U.S. Cl. ....................................................... 707/687
(58) Field of Classification Search .................. 707/609, 707/705, 687, 694
 See application file for complete search history.

(56) References Cited

U.S. PATENT DOCUMENTS

| 7,619,782 | B2* | 11/2009 | Mikami | 358/3.28 |
|---|---|---|---|---|
| 2002/0083059 | A1* | 6/2002 | Hoffman et al. | 707/9 |
| 2003/0120639 | A1* | 6/2003 | Potok et al. | 707/3 |
| 2006/0046691 | A1* | 3/2006 | Nishio | 455/410 |
| 2006/0184526 | A1* | 8/2006 | Bossemeyer et al. | 707/6 |
| 2006/0291005 | A1* | 12/2006 | Genda | 358/474 |
| 2007/0112725 | A1* | 5/2007 | Lin et al. | 707/2 |
| 2007/0199063 | A1* | 8/2007 | Howard et al. | 726/12 |
| 2007/0201107 | A1* | 8/2007 | Ando et al. | 358/468 |
| 2007/0282860 | A1* | 12/2007 | Athineos et al. | 707/10 |
| 2008/0021876 | A1* | 1/2008 | Ahern et al. | 707/3 |
| 2008/0025748 | A1* | 1/2008 | Ogino et al. | 399/82 |
| 2008/0040347 | A1* | 2/2008 | Potok et al. | 707/6 |
| 2008/0222105 | A1* | 9/2008 | Matheny | 707/3 |
| 2008/0297812 | A1* | 12/2008 | Watanabe | 358/1.9 |
| 2009/0024662 | A1* | 1/2009 | Park et al. | 707/104.1 |
| 2009/0106431 | A1* | 4/2009 | Garfinkle et al. | 709/228 |
| 2009/0276709 | A1* | 11/2009 | Venneman et al. | 715/716 |
| 2010/0095269 | A1* | 4/2010 | Bouillet et al. | 717/104 |

OTHER PUBLICATIONS

Fritz Onion; Demystifying Subclassing; C++ Report; Jul. 1997.
"Tag (metadata)," Wikipedia, http://en.wikipedia.org/wiki/Tag_(metadata), Nov. 13, 2008.

* cited by examiner

*Primary Examiner* — Angela Lie
(74) *Attorney, Agent, or Firm* — Advantedge Law Group

(57) ABSTRACT

A computer-implemented method comprising identifying a tag, receiving a setting, and associating the setting with the tag. The tag may be associated with an object. The computer-implemented method may also comprise performing an action based on the setting, and the action may be performed with respect to the object. A computer-implemented method may comprise receiving a tag from a user interface, identifying a module, and associating the tag with a module. Corresponding systems and computer-readable media are also disclosed.

20 Claims, 10 Drawing Sheets

METHODS AND SYSTEMS FOR TAG-BASED OBJECT MANAGEMENT

BACKGROUND

As the World Wide Web moves into the Web 2.0 era, online communities created for sharing information, media, and other user-generated content have become popular. End users may now have access to many tools and technologies that creatively categorize user-generated content. User-generated content, which may be anything from files and data to movies and media, may be categorized and shared with others through folksonomy or social classification.

Social classification, which may refer to "tagging content," may facilitate content organization in a way that is not available from traditional content organization systems. In order to tag content, such as a file, an end user may create one or more tags and associate the tags with the file. Current tagging techniques may allow for tagging photos, music, movies, blogs, feeds, files, documents, and many other types of content. For example, an end user may wish to tag a vacation photo as "sunny, vacation, Bob, Michelle, Hawaii." The end user may find the photo searching by tags, as opposed to searching by file location. If the end user performed a tag search for Bob, all photos including the tag "Bob" may be located.

Tagging systems may provide various categorization and search capabilities. For example, some systems may allow users to search content by one tag at a time, while other systems may allow users to search by multiple tags. Some systems may even provide "tag clouds," which are visual representations of tags used on a website. Such systems may help users find and organize content.

Although tagging systems may provide various advantages over subject indexing or other traditional organizational schemes, most tagging systems offer only limited content control. For example, tagging systems may only allow particular types of content to be tagged. Also, users may typically rely on traditional security measures, which provide security at the file or folder level, to protect their tagged content. Traditional tagging systems may also fail to take advantage of the unique nature of tagging to provide efficient sharing of tagged content. Users may benefit from tagging systems and methods that take advantage of the unique nature of tagging to provide more efficient and effective content management.

SUMMARY

Embodiments of the instant disclosure may address various disadvantages and problems with prior tagging systems and may also provide various other advantages and features. For example, some embodiments may allow various types of content to be tagged. Also, certain embodiments may provide for settings, such as security and/or sharing settings, to be associated with tags.

As noted, some embodiments of the present disclosure may allow various types of content to be tagged. For example, a computer-implemented method may comprise associating a tag with a module. A module may comprise, but is not limited to, a user interface (i.e., a window), a sub-routine of an application, or the application itself. The computer-implemented method may also comprise receiving the tag from a user interface and identifying the module. In at least one embodiment, receiving the tag from a user interface may be performed as part of a window sub-classing process.

Various embodiments of the instant disclosure may provide for a setting to be associated with a tag. For example, a method may comprise identifying a tag, and the tag may be associated with an object. An object may be a module, a digital file, and/or any other suitable content or digital information. The method may further comprise receiving the setting and associating the setting with the tag. In some embodiments, an action may be performed based on the setting. The action may be performed with respect to the object.

In certain embodiments, performing the action based on the setting may comprise determining, based on the setting, whether to permit access to the object. Performing the action based on the setting may also comprise transferring the object, copying the object, reformatting the object, watermarking the object, backing up the object, issuing a notification about the object, or performing any other suitable action with respect to the object.

Embodiments of the instant disclosure provide various methods, systems, and computer-readable media for managing content. Some embodiments may provide improved and more flexible security for tagged content. Certain embodiments may allow a user to tag windows and other types of modules. At least one embodiment may allow a user to define a tag that initiates an object-sharing action. Various embodiments may combine some or all of these features and/or may provide alternative or additional features.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
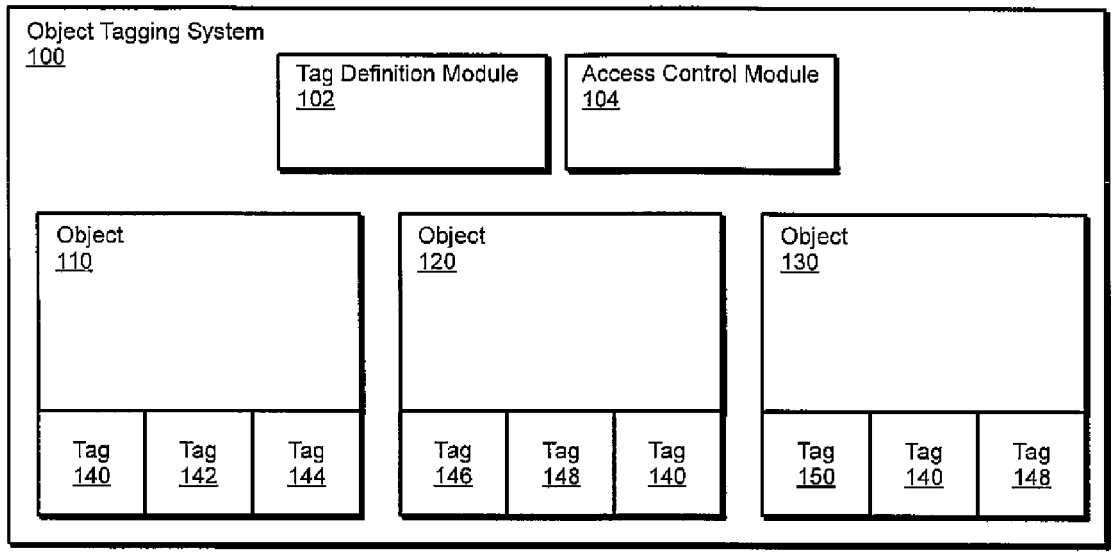
FIG. 1 is a block diagram of an exemplary system capable of implementing one or more of the embodiments described and/or illustrated herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various exemplary embodiments and should not be taken to be limiting in any way. Various exemplary methods and systems for managing objects with tags are described and/or illustrated herein. For example, the present disclosure presents methods and systems for associating security and sharing settings with a tag. The instant disclosure also presents embodiments for associating a tag with a module. Embodiments of the instant disclosure apply to various computer and network devices and systems. As discussed in greater detail below, embodiments of the instant disclosure may provide for more efficient and effective management of objects.

Tagging may generally refer to the process of associating a keyword or other term with an object. Tags may enable keyword-based classification, search, and organization of objects. Tagging systems may be used to associate tags with digital pictures, digital videos, web pages, blog entries, or any other suitable data objects. Tagging may also be referred to as folksonomy, collaborative tagging, social classification, social indexing, social tagging, and various other names. In contrast to traditional organizational schemes, tags may be generated not only by administrators and other experts, but also by creators and consumers of data objects. Also, in many tagging systems, the tags may be chosen freely instead of being subject to a controlled vocabulary.

In some embodiments, tags may refer to user-defined metadata. User-defined metadata may describe embedded data or information within data that describes or further defines the data. User-defined metadata may be any metadata controlled or set by the user. User-defined metadata may include device metadata such as digital-picture-date stamps, camera settings, or any other suitable metadata. For example, a user may define date stamps that appear in a digital photo's metadata by adjusting the date during the initial digital camera setup. According to some embodiments, the user may then be able to categorize digital photos by date, using the date-stamp metadata as tags.

According to various embodiments, tags may comprise human-readable text (e.g., words, phrases, and/or characters that may be easily read or understood by a human). Tags may also be created by content owners and/or content managers. For example, if a user takes a picture of a dog, the user may be considered the owner of the picture and may tag the picture "dog." In a collaborative tagging environment, and even in other tagging environments, objects may also be tagged by non-owners. In some embodiments, a tag may describe a property or feature of the object or objects with which the tag is associated.

Tagging may be part of an evolving internet movement referred to as Web 2.0. Web 2.0 may be a second generation of web-based communities and services that provide collaboration and sharing between internet users. In addition to tagging, Web 2.0 may refer to social-networking sites, social bookmarking, blogs, wikies, podcasts, rss feeds, and various other network-based services and applications. As previously noted, tagging and other Web 2.0 applications may provide for improved organization of objects. However, these systems may not be optimized for object security or for sharing objects.

Figure 3:
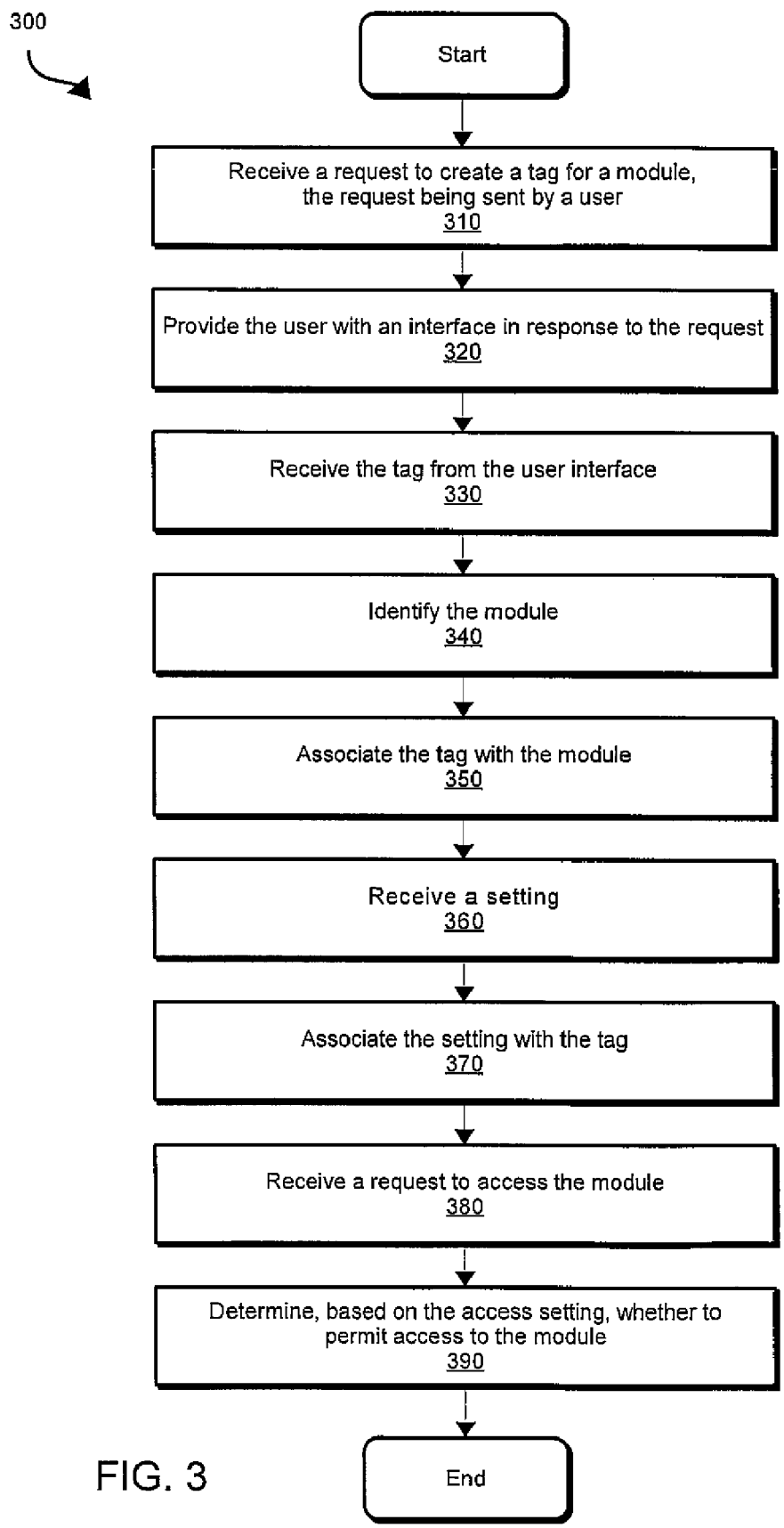
FIG. 3 is a flow diagram of an exemplary computer-implemented method for associating a setting with a module tag according to certain embodiments.
Figure 4:
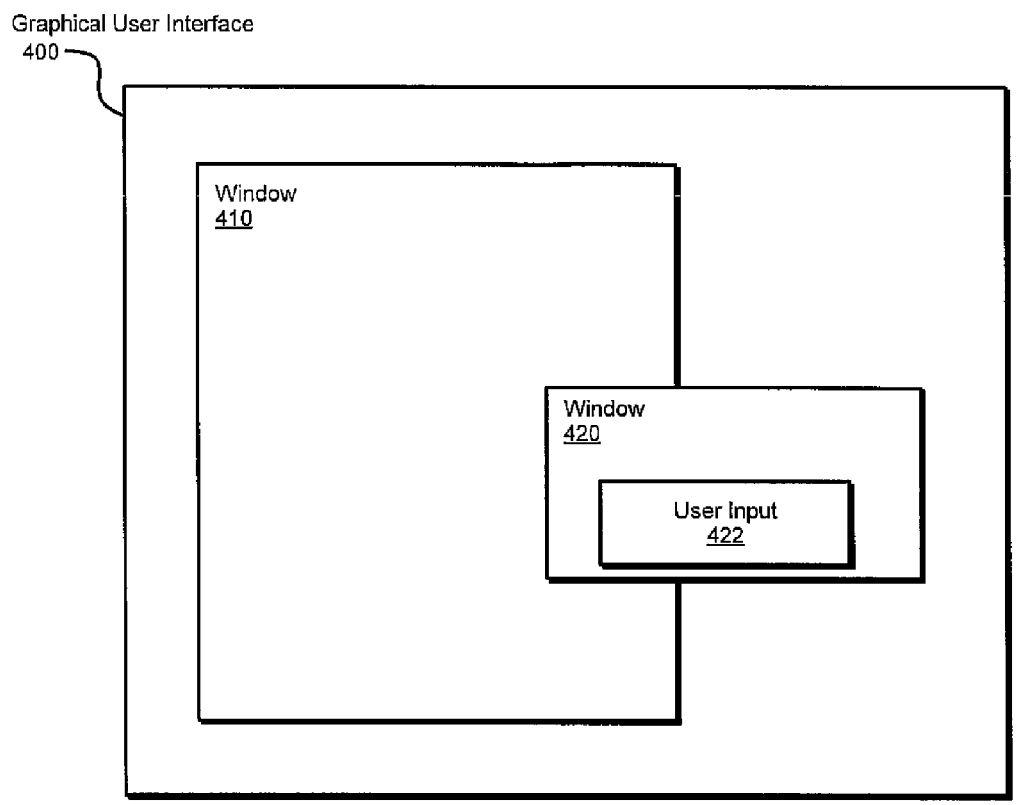
FIG. 4 is a block diagram of an exemplary computer-implemented system for window sub-classing according to certain embodiments.
Figure 5:
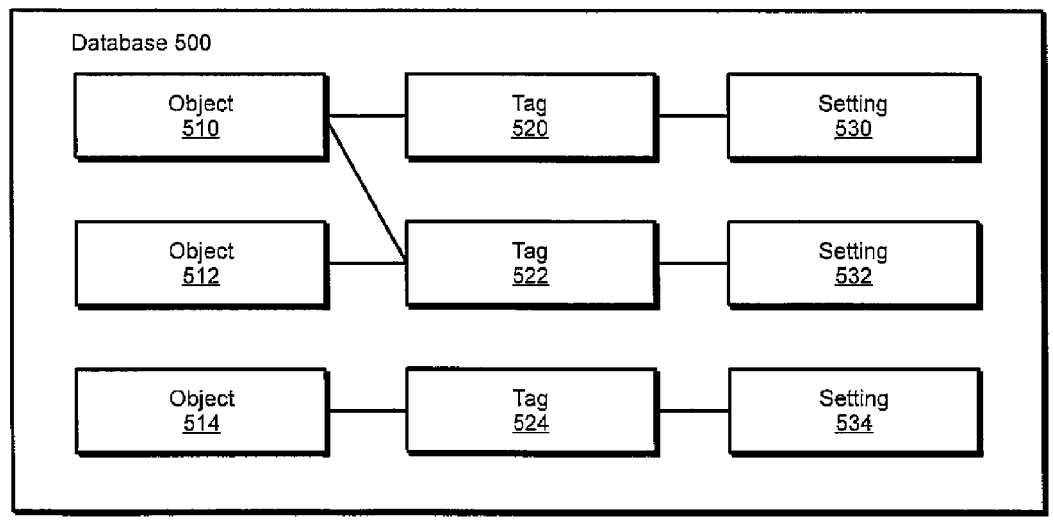
FIG. 5 is a block diagram of an exemplary computer-implemented system for storing tag, setting, and object relationships according to certain embodiments.
Figure 6:
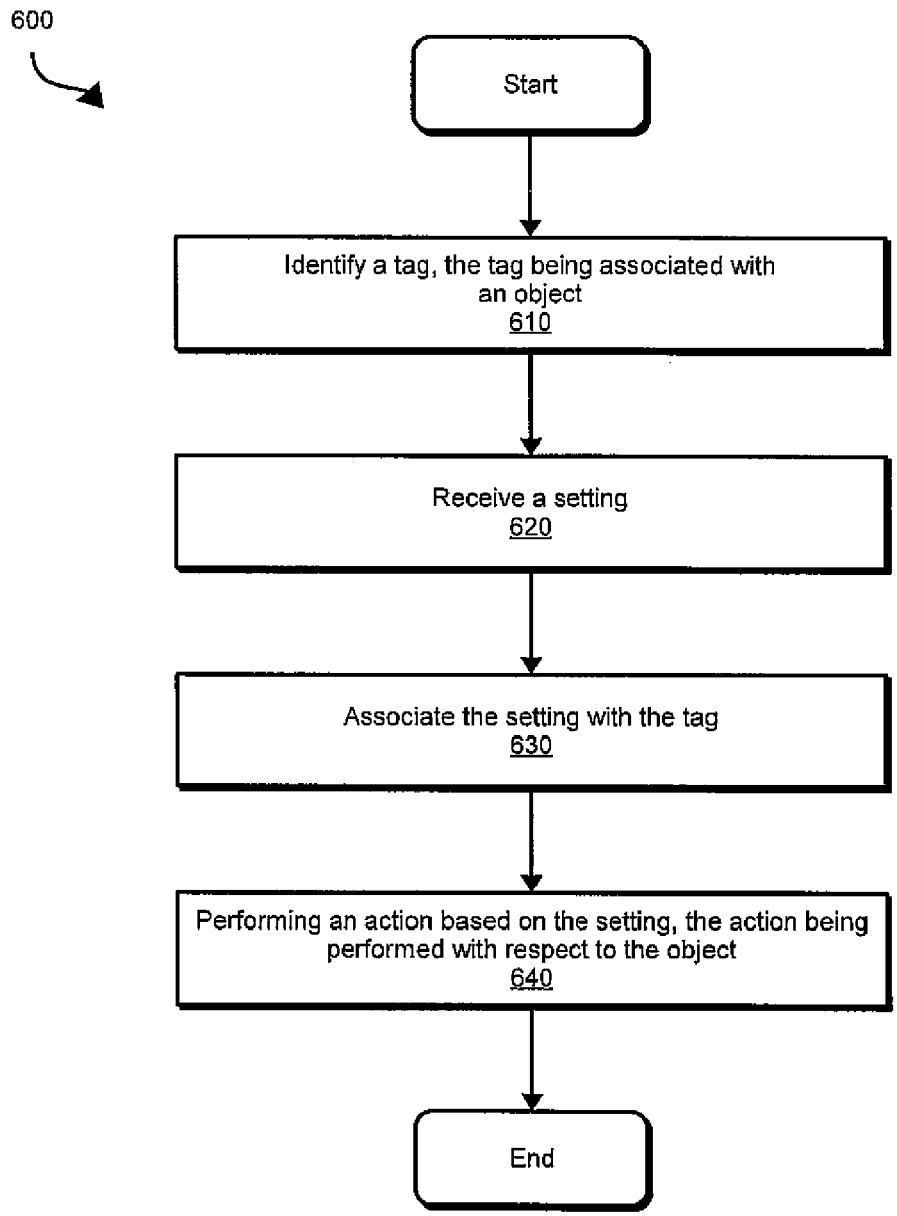
FIG. 6 is a flow diagram of an exemplary computer-implemented system for managing objects using tag-based settings according to certain embodiments.
Figure 7:
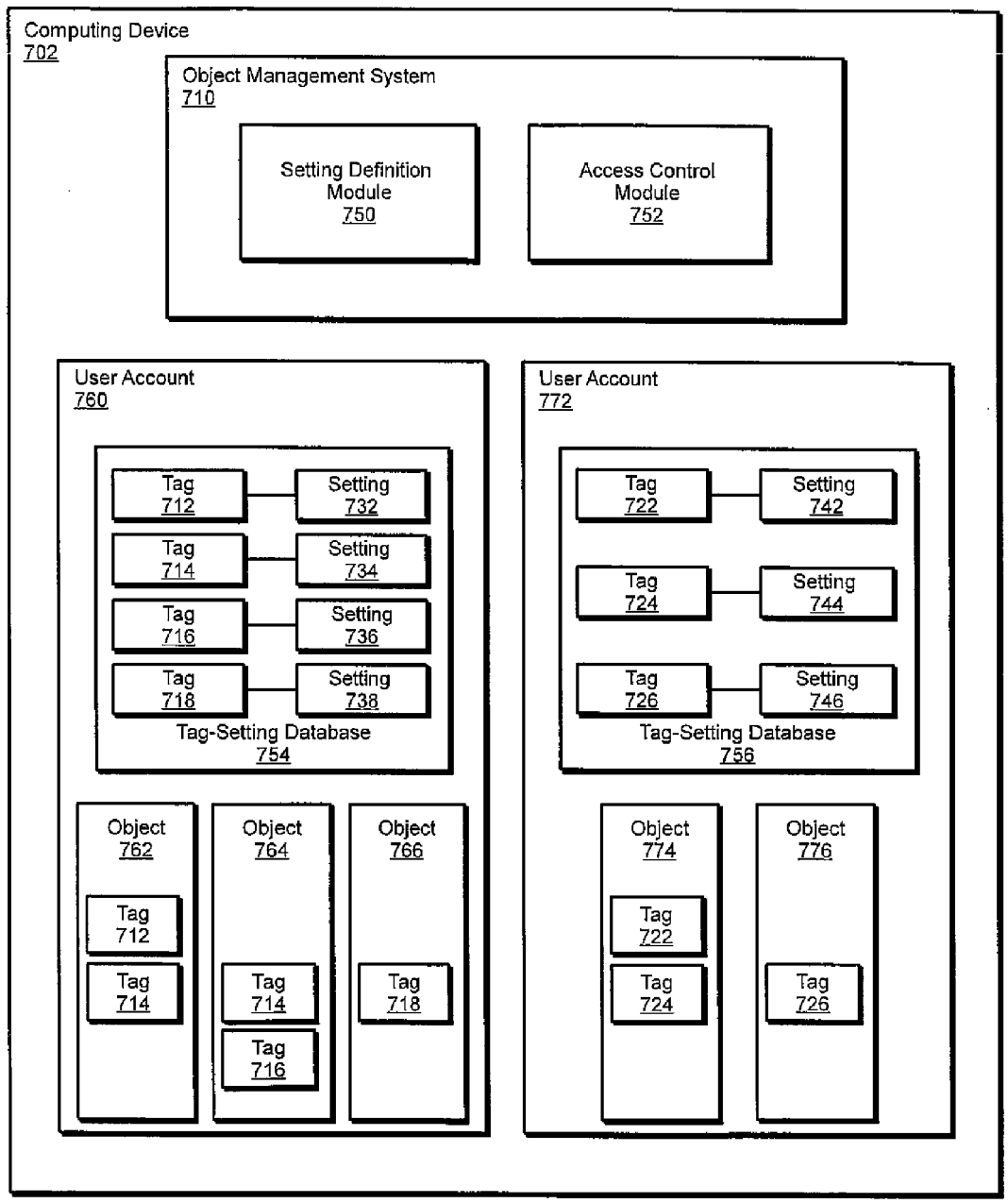
FIG. 7 is a block diagram of an exemplary system capable of implementing one or more of the embodiments described and/or illustrated herein.
Figure 8:
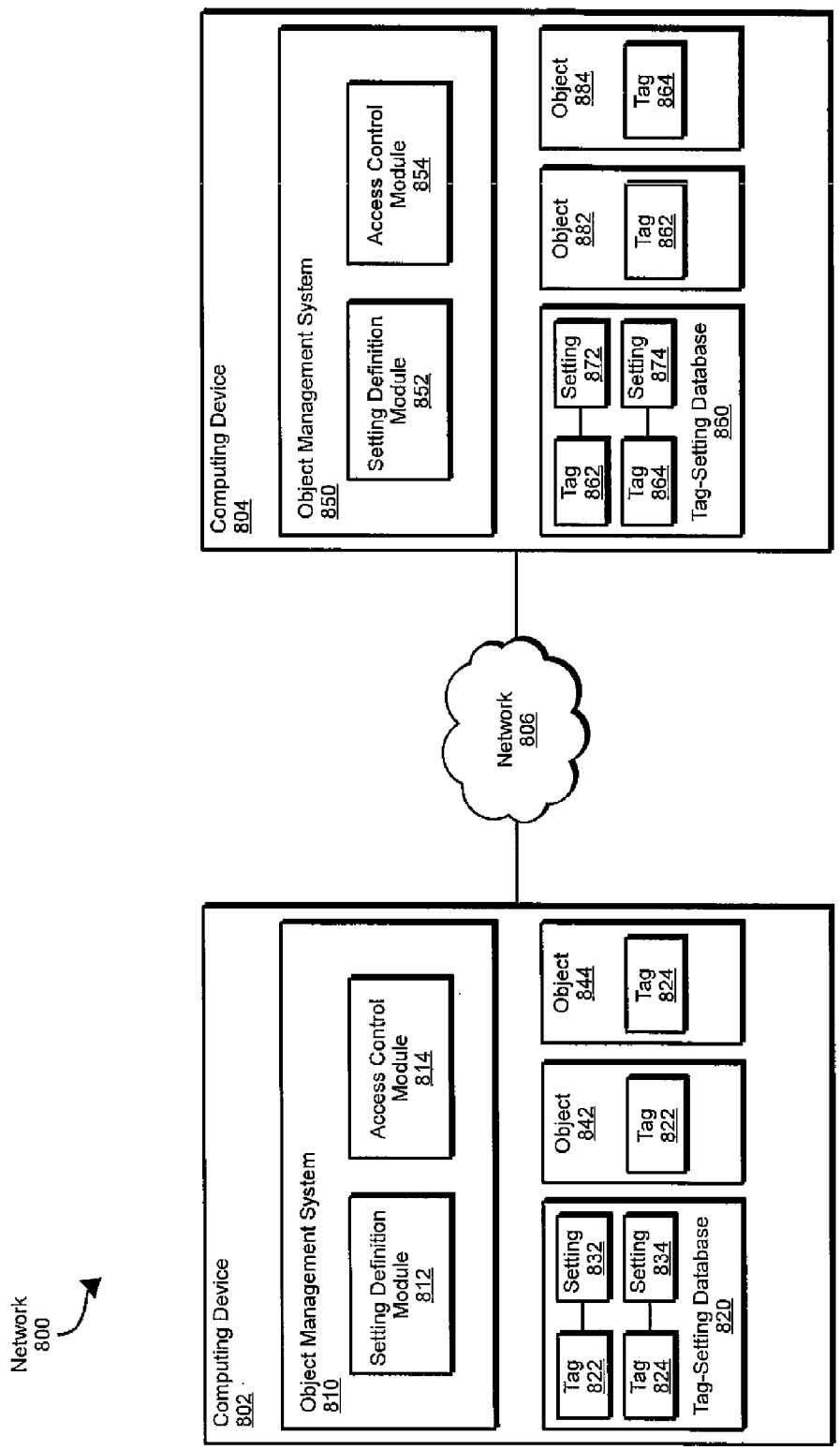
FIG. 8 is a block diagram of an exemplary network capable of implementing various embodiments described and/or illustrated herein.
Figure 9:
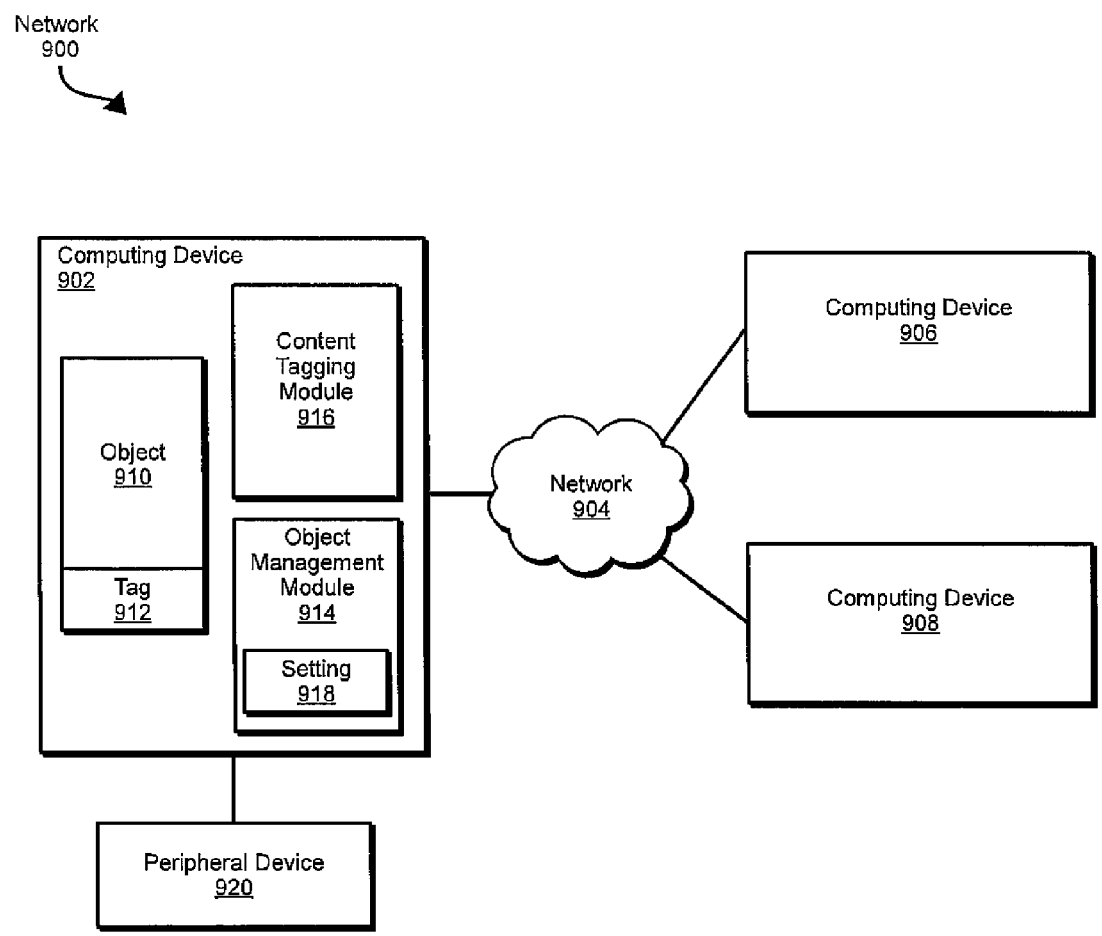
FIG. 9 is a block diagram of an exemplary network capable of implementing various embodiments of tag-based sharing.
Figure 10:
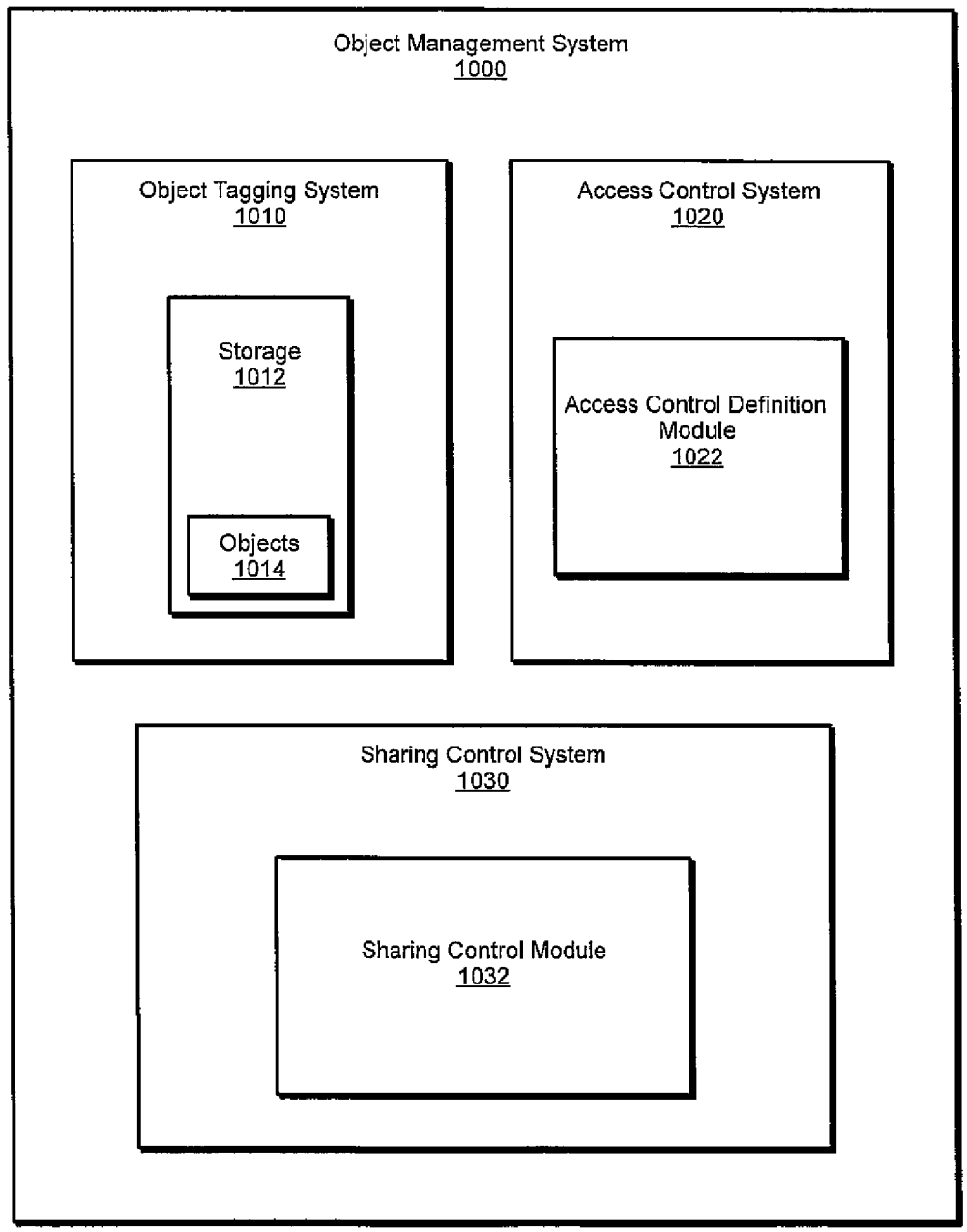
FIG. 10 is a block diagram of an exemplary system for managing objects according to certain embodiments.

The following disclosure presents various examples of tag-based object management. FIGS. 1-4 illustrate various methods and systems for tagging modules and other objects. FIG. 5 shows a database that may be used to store objects, tags, settings, and the relationships between objects, tags, and settings. FIG. 6 presents a general method for performing an action based on a tag setting. The action may be an access action, a sharing action, or any other suitable action. FIGS. 7-8 illustrate systems for implementing tag-based access control. FIGS. 9 and 10 show systems and networks for implementing tag-based sharing.

FIG. 1 illustrates an object tagging system 100. In some embodiments, the object tagging system may be software run from servers, user computing devices, and/or any suitable combination of software and computing devices. For example, a photo-storage server may include software that may be operable as an object tagging system. The photo-storage server may allow users to upload and tag pictures. In other embodiments, a computing device may include software that allows users to tag music, modules, and other various content.

Object tagging system 100 may include a tag definition module 102 and an access control module 104. Tag definition module 102 may allow a user to associate tags with objects. As shown, object tagging system 100 may include an object 110, an object 120, and an object 130. An object may be any suitable data object, including a digital file, a digital picture, a digital music file, a digital video file, a web page, a blog entry, an application, a module, a window, a user interface, an internet bookmark, a word processing file, a computing resource, or any other suitable digital information.

A user may associate one or more tags with an object. The process of associating a tag with an object may comprise embedding the tag in the object, including the tag in the same data structure as the object, providing a database link between the tag and the object, or any other suitable association method or mechanism. The user may be an owner of the object, an administrator, a consumer or viewer of the object, or any other user with access to the object. A user may assign any number of tags to a particular object. As shown in FIG. 1, a tag 140, a tag 142, and a tag 144 are associated with object 110. FIG. 1 also shows that tags 146, 148, and 140 are associated with object 120, and tags 150, 140, and 148 are associated with object 130.

In an exemplary embodiment, objects 110, 120, and 130 may be windows. A window may generally refer to a graphical user interface or any other suitable interface that presents a user with information and/or receives information from a user. For example, objects 110, 120, and 130 may be interfaces of an organizational application. Object 110 may be a mail window, object 120 may be a calendar window, and object 130 may be a task window. A user may want to permit or prohibit certain people from accessing these windows. The user may assign tags to each object to facilitate access control to the objects. In one example, tag 140 may be the text "Bob," tag 142 may be the text "Fred," tag 144 may be the text "Cindy," tag 146 may be the text "Carl," tag 148 may be the text "Janet," and tag 150 may be the text "Jamie."

If the user wants to allow Bob, Fred, or Cindy to access the mail window, the user may associate the tags 140, 142, and 144 with object 110. Similarly, if the user wants to allow Carl, Janet, and Bob to access the calendar window, the user may assign tags 140, 146, and 148 to object 120. Also, if the user wants to allow Bob, Janet, and Jamie to access the task window, the user may assign tags 140, 148, and 150 to object 130. When Carl attempts to access the calendar, access control module 104 may use tag 146 to determine that Carl should have access to object 120. Access control module 104 may then grant Carl access to object 120. The process of granting security access and using other settings through tags is described in greater detail in the text corresponding to FIGS. 5 and 6.

Figure 2:
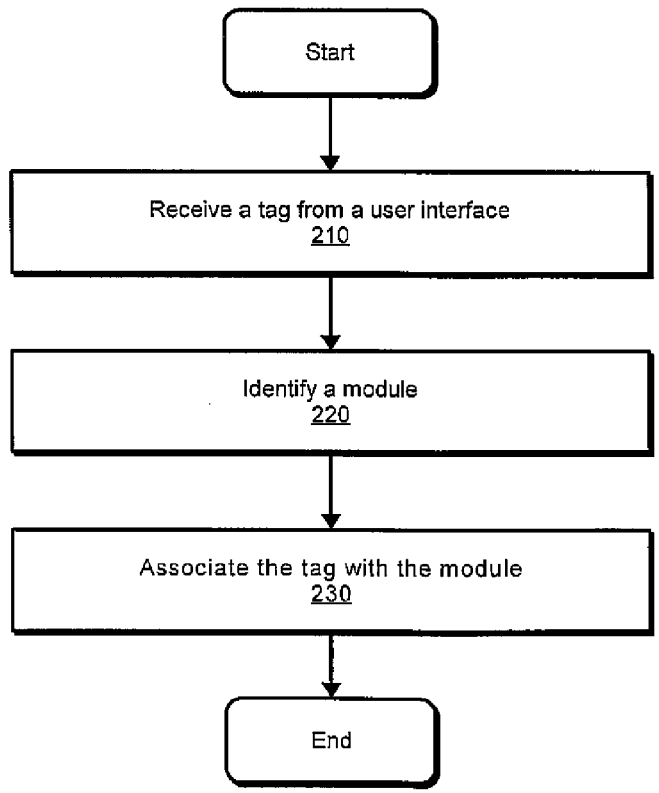
FIG. 2 is a flow diagram of an exemplary method for associating a tag with a module according to certain embodiments.

As the previous example demonstrates, providing security options for windows may provide users with a tool that may improve security for their applications. Tagging windows and other modules may provide users with greater control over their software and may provide greater flexibility in sharing windows and other modules with other users. FIGS. 2-4 provide additional examples of tagging modules and providing tag-based security and sharing for modules.

FIG. 2 is a flow diagram of a process for associating a tag with a module. First, a tag definition module may receive a tag from a user interface (step 210). For example, a user may type a word or a phrase in the user interface. In some embodiments, a tag definition module may receive multiple tags at a time from a user interface. In other embodiments, the tag definition module may receive a tag from a memory device or a network device.

The tag definition module may also identify a module (step 220). Identifying the module may comprise receiving information that designates or identifies the module. In various embodiments, a module may be an interface of an application, a window of an application, a sub-routine, a word processing application, an email application, a spreadsheet application, a game application, or any other suitable software application or interface.

The tag definition module may associate the tag with the module (step 230). In some embodiments, the tag may be associated with the module as part of a window sub-classing process. In other embodiments, the tag definition module may use any other suitable association mechanism to associate tags with modules.

Tagging a module may provide numerous advantages in security and sharing of the module. Users may be able to provide tighter security, more flexible access to a greater number of software tools, and more efficient sharing with other users. Many of these features and advantages may be implemented by associating a setting with a module tag.

FIG. 3 illustrates an example of associating a setting with a module tag. In some embodiments, a tag definition module may receive a request to create a tag for the module (step 310). The request may be sent by a user. According to some embodiments, a tag definition module may be any computer-executable code capable of associating a setting with a tag. In response to the request, the tag definition module may provide the user with an interface (step 320). The process of providing the user with an interface may be performed through window sub-classing (as shown in FIG. 4) or any other suitable process. The tag definition module may receive the tag from the user interface (step 330). The tag definition module may also identify the module (step 340). As previously described, the tag definition module may then associate the tag with the module (step 350).

In certain embodiments, a user may input a setting for the tag and/or associate a setting with the tag into the same interface used to create the tag. In other embodiments, the user may input the setting for the tag in a separate interface. Also, a user may input a setting for the tag and associate a setting with the tag at the same time, or the user may input a setting and associate the setting with a tag at a later time.

As shown in FIG. 3, a setting definition module may receive a setting (step 360). The setting definition module may associate the setting with the tag (step 370). In certain embodiments, the setting definition module may also identify the tag even if the tag is not being formed at the same time that a setting is being created. Associating a setting with a tag may comprise identifying the tag in the setting, embedding the setting in the tag, including the setting in the same data structure as the tag, providing a database link between the setting and the tag, or any other suitable association method or mechanism.

According to some embodiments, a policy enforcement module may use the setting to control access to the module. For example, the policy enforcement module may receive a request to access the module (step 380). The request may come from a user, as described in FIG. 1. In other embodiments, the request may come from a remote computing device, such as a network device. The policy enforcement module may determine, based on the access setting, whether to permit access to the module (step 390). For example, if the access setting is set to "read access for Media Access Control (MAC) address 1, modify access for MAC address 2, no write access for MAC address 3," these settings may be applied to the tag. Thus, the computing device associated with MAC address 1 may be allowed to read the module, the computing device associated with MAC address 2 may be able to modify the module, and the computing device associated with MAC address 3 may be prohibited from overwriting the module.

FIG. 4 illustrates an example of window sub-classing. Window sub-classing may allow a tag definition window to be substituted for a particular window of an application. The tag definition window may allow a user to input a tag that will be associated with the underlying window. FIG. 4 shows a graphical user interface 400. Graphical user interface 400 may be a computer monitor or any other computer interface. Graphical user interface 400 may include an application window 410. A user may want to associate a tag with window 410 and may perform some action with respect to window 410 to initiate the tagging process. For example, the user may right click on window 410, click on an option button in window 410, press a shortcut key while window 410 is active, or perform any other suitable action with respect to window 410 to initiate a tagging process.

The action performed by the user may initiate a window sub-classing routine. The window sub-classing routine may provide a sub-window, such as window 420. Window 420 may allow a user to input a tag. For example, window 420 may include a text entry box, such as user input box 422. User input box 422 may also be referred to as a dialog box. According to some embodiments, window sub-classing may be performed by rerouting messages from an operating system to an application window (e.g., window 410) to a separate dialog window (e.g., user input window 420). This message rerouting may be triggered by an action performed by the user, as previously described. After the user inputs the tag in window 420, window 420 may pass control back to window 410.

Window 420 may also provide other functionality. In some embodiments, window 420 may allow a user to define a setting for the tag. In other embodiments, window 420 may provide a link or connection to a text entry box, a dialogue box, a tag definition window, or any other suitable box or window.

As previously mentioned, tags and settings, and the relationships between objects, tags, and settings, may be stored in a database. FIG. 5 illustrates a database 500 for storing tags, settings, and relationships between tags, settings, and objects. Database 500 may include an object 510, an object 512, and an object 514. Object 510 may be associated with a tag 520 and a tag 522. Object 512 may be associated with tag 522, and object 514 may be associated with a tag 524. As shown, tag 520 may be associated with a setting 530, tag 522 may be associated with a setting 532, and tag 524 may be associated with a setting 534.

Database 500 may be any suitable database, such as a MySQL database, an access database, or any other data structure or storage device capable of storing data. Relationships between objects and tags may be one-to-one relationships, one-to-many relationships, and/or many-to-one relationships. Similarly, relationships between tags and settings may be one-to-one relationships, one-to-many relationships, and/or many-to-one relationships.

In one example, objects 510, 512, and 514 may be pictures. For example, objects 510 and 512 may be pictures that a user took during a vacation, and object 514 may be a picture of a sunset. A user may tag objects 510 and 512 with tag 522, which may contain the text "vacation." Object 512 may be a picture from a vacation in London, and object 510 may be a picture from a vacation in Paris. A user may tag object 510 with tag 520, which may contain the text "Paris." A user may tag object 514 with the tag 524, which may contain the text "nature." In some embodiments, a user may want to allow anyone to see pictures of nature but only friends to see pictures of vacations. Setting 534 may be defined as general access, and settings 530 and 532 may be defined to deny access to anyone but friends. Thus, setting 534 may permit general access to object 514, while settings 530 and 532 may prevent access to objects tagged with "Paris" or "vacation" to anyone but friends. Friends may be defined within a setting in a number of ways, including user names, hardware addresses associated with the friends' devices, Internet Protocol (IP) addresses associated with the friends' devices, or any other suitable identifying mechanism.

FIG. 5 shows objects, tags, and settings stored in a single database. In some embodiments, different databases or data storage devices may store tags, settings, and/or objects. In at least one embodiment, a first database may store the tags and objects, and a second database may store the settings. In other embodiments, a first database may store the tags, a second database may store the objects, and a third database may store the settings. Various other storage arrangements also fall within the scope of the instant disclosure.

In some embodiments, a user may create a tag before associating the tag with the object. For example, the user may come up with a set of category names to use as tags. Then, as the user adds objects to the tagging system, the user may associate one of the pre-defined tags with the object. Similarly, a user may also create a setting before associating the setting with a tag.

FIGS. 6-9 provide additional examples and procedures for associating settings with tags. FIG. 6 provides an example of managing an object using tag-based settings. In some embodiments, a setting definition module may identify a tag, and the tag may be associated with an object (step 610). Identifying a tag may comprise receiving a tag itself or information that describes and/or identifies a tag. Identifying a tag may include, without limitation, receiving notification that a tag has been created, receiving a tag, receiving information about a tag, or receiving any other relevant information that may include the tag or may be related to the tag. Identifying the tag may comprise various processes. For example, identifying a tag may comprise polling an object tagging system to identify a tag. Identifying a tag may also comprise receiving a notification that the tag was created, receiving the tag, receiving information about the tag, or receiving any other tag-related information.

The setting definition module may also receive a setting (step 620). The setting may be an access setting, a sharing setting, or any other suitable setting. Access settings may define read access, write access, modify access, copy access, and various other types of access. For example, an access setting for a window may simply state whether access to view the window is permitted. Sharing settings may include settings that define actions to be performed on the object. For example, a sharing setting may be a setting that requires the object to be copied to a network device, uploaded to a web site, or transferred to a peripheral device. Embodiments of the instant disclosure also comprise various other types of sharing settings. In some embodiments, settings may be received for tags that are not associated with an object. For example, a software application may allow a user to define settings for a tag and store the tag-to-setting associations in a database, regardless of whether an object is currently associated with the tag.

The setting definition module may associate the setting with the tag (step 630). In some embodiments, a setting may be associated with a tag if the setting identifies the tag. For example, the setting may define a particular access or sharing setting for a particular tag. In such embodiments, a setting (or an entire set of settings) may be stored and managed independent from the tags with which they are associated. As previously mentioned, a setting may also be associated with a tag by storing the setting and the tag together, embedding the setting in the tag, tying the setting and the tag together using database associations, or through any other suitable association method.

After the setting is associated with the tag, an action may be performed based on the setting (step 640). The action may be performed with respect to the object. In some embodiments the action may be performed in response to an attempt to access the object. For example, an access control module may receive a request to access the object and may determine, based on the setting, whether to permit access to the object. In other embodiments, performing the action based on the setting may comprise transferring the object, copying the object, reformatting the object, watermarking the object, backing up the object, issuing a notification about the object, running a script, or performing any other action in response to the setting. Such actions may be performed by a sharing control module.

The phrase "with respect to the object" may generally describe that the action being performed is related to the object. In certain embodiments, the action may be a sharing action in which the action is being performed on or to the object. In other embodiments, the action may be an access action, which may be an action that concerns an object but does not necessarily directly involve the object during the action. Denying access to an object may be an example of action that indirectly involves the object.

In order to determine when to perform sharing actions, such as transferring, copying, or reformatting, a sharing control module may need to know when a setting has been associated with a tag and/or when a tag has been associated with an object. The sharing control module may poll an object tagging system to identify a tag. For example, the sharing control module may poll the object tagging system to determine whether a tag has been created, whether the tag has been associated with a new object, whether the tag has been associated with a new setting, or any other relevant information about the tag. In some embodiments, the sharing control module may receive a notification that the tag was created. The sharing control module may receive the notification from a tag definition module. In other embodiments, the sharing control module may receive a notification that a setting was associated with a tag, or that a tag was associated with an object. In at least one embodiment, the sharing control module may receive the tag itself or may receive other information about the tag.

FIG. 7 illustrates an exemplary computing device 702. Computing device 702 may include one or more user accounts for storing tag-to-setting associations within a database. The user accounts may also store and manage multiple objects. FIG. 7 shows a user account 760 and a user account 772 with respective tag-setting databases 754 and 756. Tag-setting databases 754 and 756 may be any database capable of storing tag-to-setting associations.

User account 760 may include an object 762, an object 764, and an object 766. Object 762 may be associated with a tag 712 and a tag 714. Object 764 may be associated with tag 714 and a tag 716, and object 766 may be associated with a tag 718. Tag-setting database 754 may define relationships between tag 712 and a setting 732, tag 714 and a setting 734, tag 716 and a setting 736, and tag 718 and a setting 738.

User account 772 may include an object 774 associated with a tag 722 and a tag 724. User account 772 may also include an object 776 associated with a tag 726. Tag-setting database 756 may define relationships between tag 722 and a setting 742, tag 724 and a setting 744, and tag 726 and a setting 746.

Computing device 702 may also include an object management system 710. Object management system 710 may include setting definition module 750 and access control module 752. Setting definition module 750 may allow a user to define settings and associate settings with tags. A setting definition module may be a stand-alone application, a plug-in for an object management system (such as a tagging system), or any other code capable of defining settings and/or associating settings with tags. Access control module 752 may control access to objects based on settings.

In various exemplary embodiments, computing device 702 may be a personal computer capable of hosting multiple user accounts. For example, computing device 702 may be a family-used personal computer capable of hosting one or more user accounts for different members of the family. User account 760 may belong to a family member Chris and user account 772 may belong to a family member Amy. Other accounts for Dad, Josh, and Mary may be included, though not illustrated. In Chris' user account 760, object 762 may be a school paper saved as a word document, object 764 may be a slideshow for the school paper, and object 766 may be an mp3 file. Chris may have already associated the tags with the objects. Tag 712 may be the text "paper", tag 714 may be the text "project12", tag 716 may be the text "slideshow", and tag 718 may be the text "music."

In one embodiment, Chris may set access definitions with the setting definition module 750. Object management system 710 may be available to all users on the personal computer and may allow the users to set access definitions for tags, store the tags in a tag-setting database, add objects, add tags, and/or perform other object management tasks. Chris may create definitions for settings 732, 734, and 738 that allow Dad full access to all objects associated with the tag "paper" and tag "project 12", and no access to the tag "music." Chris may create definitions for settings 732, 734, 736, and 738 that allow Amy read-only access to any objects associated with any tag.

For Josh, Chris may set definitions that allow full access to the object associated with the tag "music" and no access to objects associated with the tags "paper", "project12", and "slideshow." Chris may also create a definition for setting 736 that allows Mary full access to the object associated with the tag "slideshow." Thus, settings 732 and 734 may be defined as full access for Dad, read-only access for Amy, and no access for Josh. Setting 736 may be defined as read-only access for Amy, no access for Josh, and full access for Mary. Setting 738 may be defined as no access for Dad, read only access for Amy, and full access for Josh.

The access control module may control access to objects 762, 764, and 766 based on the tag-to-setting associations stored in each user accounts' tag-setting database. For example, Dad may request access to object 762. Access control module 752 may allow Dad to read or write to the word document based on settings 732 and 734. User Josh may request access to the same object 762, but he may be denied access based on settings 732 or 734. Similarly, based on settings 732, 734, 736, and 738, Amy may read the word document, view the slideshow, and listen to the mp3 file, but may not be allowed to write to or change these files. Mary may view the slideshow as well as make changes to it.

In another example, Chris and Amy may have a tag with the same text but with different access settings. For example, Chris may tag a digital picture, object 766, with tag 712. Tag 712 may be the text "Hawaii." Chris may define setting 732, which is associated with tag 712, as no access for user Dad. Amy may tag a digital picture, object 776, with tag 726. Tag 726 may also be the text "Hawaii." Amy may define setting 746, which is associated with tag 726, as full access for Dad. Dad may perform a search for all digital pictures with the tag "Hawaii", discovering object 766 from Chris and object 776 from Amy. In some embodiments, discovering objects may refer to returning search results. Search results may be provided as links to an object. Based on the settings from each tag-setting database, Dad may not be able to access object 766, but may have full access to object 776, even though they are both tagged with the same text—"Hawaii."

In certain embodiments, conflicting tag settings for a single object may be resolved by defining priorities for tag settings, using a default setting, or any other suitable process for resolving a tag setting conflict. For example, object 774 may have two conflicting access settings. Setting 742 may permit a user associated with user account 760 read access, but setting 744 may deny the user associated with user account 760 any access. In one example, a user associated with user account 772 may set a default conflict access setting to "deny", thus denying the user associated with user account 760 access to object 774. In another example, a user associated with user account 772 may give setting 742 priority over setting 744, thus allowing the user associated with user account 760 read access to object 774. In some embodiments, tags with no settings may default to a user-defined setting. For example, a user may define that all tags not specifically associated with a setting be associated with a "no access" setting.

FIG. 8 illustrates an exemplary network 800 for performing object management. Exemplary network 800 may include a computing device 802 and a computing device 804. Computing device 802 may include an object management system 810, a tag-setting database 820, an object 842, and an object 844. Object management system 810 may include a setting definition module 812 and an access control module 814. Tag-setting database 820 may include a tag 822, a tag 824, a setting 832, and a setting 834. Tag 822 may be associated with setting 832, and tag 824 may be associated with setting 834.

Object 842 may be associated with tag 822, and object 844 may be associated with tag 824.

Computing device 804 may include an object management system 850, a tag-setting database 860, an object 882, and an object 884. Object management system 850 may include a setting definition module 852 and an access control module 854. Tag-setting database 860 may include a tag 862, a tag 864, a setting 872, and a setting 874. Tag 862 may be associated with setting 872, and tag 864 may be associated with setting 874. Object 882 may be associated with tag 862, and object 884 may be associated with tag 864.

In some embodiments, network 800 may be a local home or office network, a peer-to-peer network, a virtual private network, or any other suitable network. Each computing device on the network may include computer-executable code operable to define tag settings and manage access control to objects. Network 800 may include only computing devices 802 and 804 or may include any number of additional computing devices.

In one example, network 806 may be a local area office network. Three coworkers, coworker 1, coworker 2, and coworker 3 may work in the office that contains network 806. Computing device 802 may belong to coworker 1 and computing device 804 may belong to coworker 2. Computing devices for other employees may be included, though not illustrated in FIG. 8. In order to share access to work-related objects, coworker 1 and coworker 2 may define tag settings that allow them to share objects with each other. For example, object 842 may be a digital copy of building blueprints, object 844 may be a memo, object 882 may be a flow diagram, and object 884 may be a drafting application. Tag 822 may be the text "blueprint", tag 824 may be the text "memo212", tag 862 may be the text "flow31", and tag 864 may be the text "application."

Coworker 1 may want to allow coworker 2 full access to both objects on computing device 802, and coworker 2 may want to allow coworker 1 read-only access to the flow diagram but full access to the drafting application. Coworker 1 may want to permit coworker 3 read-only access to the blueprints and deny all access to the memo. Coworker 2 may want to prohibit coworker 3 from accessing the flow diagram or draft application.

The settings for the tags may then be defined by the setting definition module and stored in a tag-setting database. Coworker 1 may define setting 832 as full access for coworker 2 and read-only access for coworker 3. Setting 834 may be defined by coworker 1 as full access for coworker 2 and no access for coworker 3. Coworker 2 may define setting 872 as read-only access for coworker 1 and no access for coworker 3. Setting 874 may be defined by coworker 2 as full access for coworker 1 and no access for coworker 3.

In some embodiments, access control modules 814 and 854 may retrieve these settings from tag-setting databases 820 and 860 at the time a user requests access to an object. In other embodiments, access control modules 814 and 854 may retrieve settings from tag-setting databases 820 and 860 before receiving access requests for the objects. For example, coworker 3 may request access to object 842, which includes the digital blueprints located on computing device 802. Upon receiving the request, access control module 814 may ask tag-setting database 820 for tags and their respective settings. In this example, access control module 814 may then grant read-only access to coworker 3. When coworker 2 requests access to the same blueprints, access control module 814 may retrieve setting 832 from tag-setting database 820 and grant full access to coworker 2 based on setting 832.

In certain embodiments, a tag-setting database may push setting definitions out to the access control module. The term "push" may generally refer to an action performed without request. For example, the tag-setting database may send or transfer data to another module independent of any requests for the information. In at least one embodiment, an access control module may include tag settings and may not need to request settings from a database.

FIG. 9 shows an exemplary network 900 for implementing various embodiments of tag-based sharing control. Network 900 may include a computing device 902, a computing device 906, and a computing device 908. Computing devices 902, 906, and 908 may be connected through a network 904. Also, computing device 902 may be attached to a peripheral device 920. Computing device 902 may include a content tagging module 916, an object management module 914, and an object 910 associated with a tag 912. In some embodiments, an object management module, such as object management module 914, may also comprise an access control module.

In some embodiments, object management module 914 may detect that tag 912 is associated with object 910. Tag 912 may be associated with a setting 918, and object management module 914 may perform an operation on object 910 based on setting 918. For example, setting 918 may be a transfer setting. Object management module 914 may transfer object 910 to computing device 906 and/or computing device 908 based on setting 918. In other embodiments, setting 918 may tell object management module 914 to transfer object 910 to a peripheral device, such as peripheral device 920. In certain embodiments, object management module 914 may transfer objects to one or more computing devices or peripherals based on MAC addresses, IP addresses, device addresses, or any other suitable process of transferring objects from one device to another.

By way of example, computing device 906 may be a server acting as a photo sharing website, such as FLICKR or PICASA web albums. Object 910 may be a digital picture and tag 912 may be the text "photo." Setting 918 may be a setting that uploads any object with the tag "photo" to computing device 906. Content tagging module 916 may be software that allows a user to tag objects, and object management module 914 may be software that uses setting 918 to determine when to transfer object 910 to the photo sharing website.

Object management module 914 may be able to respond to setting 918 to perform complex sharing actions (e.g., to perform multiple sharing actions at the same time). In certain embodiments, setting 918 may be a transfer, sync, and share setting. For example, object 910 may be a digital music file, peripheral device 920 may be an mp3 player, computing device 906 may be a server operable as a music sharing website, and computing device 908 may be a personal computer in the same local area network as computing device 802. Tag 912 may be the text "music." Setting 918 may require that any object associated with the tag "music" be uploaded to the music sharing website and synced to the mp3 player. Setting 918 may also provide computing device 908 with read-only access to object 910. Object management module 914 may be a software application capable of performing each of these actions with respect to the mp3 file.

FIG. 10 shows an object management system 1000 according to some embodiments. Object management system 1000 may include an object tagging system 1010, an access control system 1020, and a sharing control system 1030. Object tagging system 1010 may include storage 1012. Storage 1012 may include an object 1014. Access control system 1020 may include an access control definition module 1022, and a sharing control system 1030 may include a sharing control module 1032. In some embodiments, object tagging system 1010, access control system 1020, and sharing control system 1030 may be part of a single application. In other embodiments, object tagging system 1010 may be a preexisting tagging system such as FLICKR, DEL.ICIO.US, PICASA, or any other object tagging system. In such embodiments, access control system 1020 and/or sharing control system 1030 may be plug-ins for object tagging system 1010. Access control system 1020 and sharing control system 1030 may also be stand-alone modules that compliment and work with object tagging systems, such as object tagging system 1010.

Providing a system that associates settings with tags may provide various advantages and features over traditional tagging systems. For example, a user may use tags to control access to the objects that the user owns. The user may also use the tags to facilitate more efficient sharing. As shown in previous embodiments, a tag associated with a certain setting may cause an object to be uploaded to a web page, transferred to a peripheral device, or transferred to a network device (e.g., a different sharing system) based on the setting. Sharing objects in this manner may save a user a substantial amount of time. Embodiments of the instant disclosure provide various other features and advantages.

Figure 11:
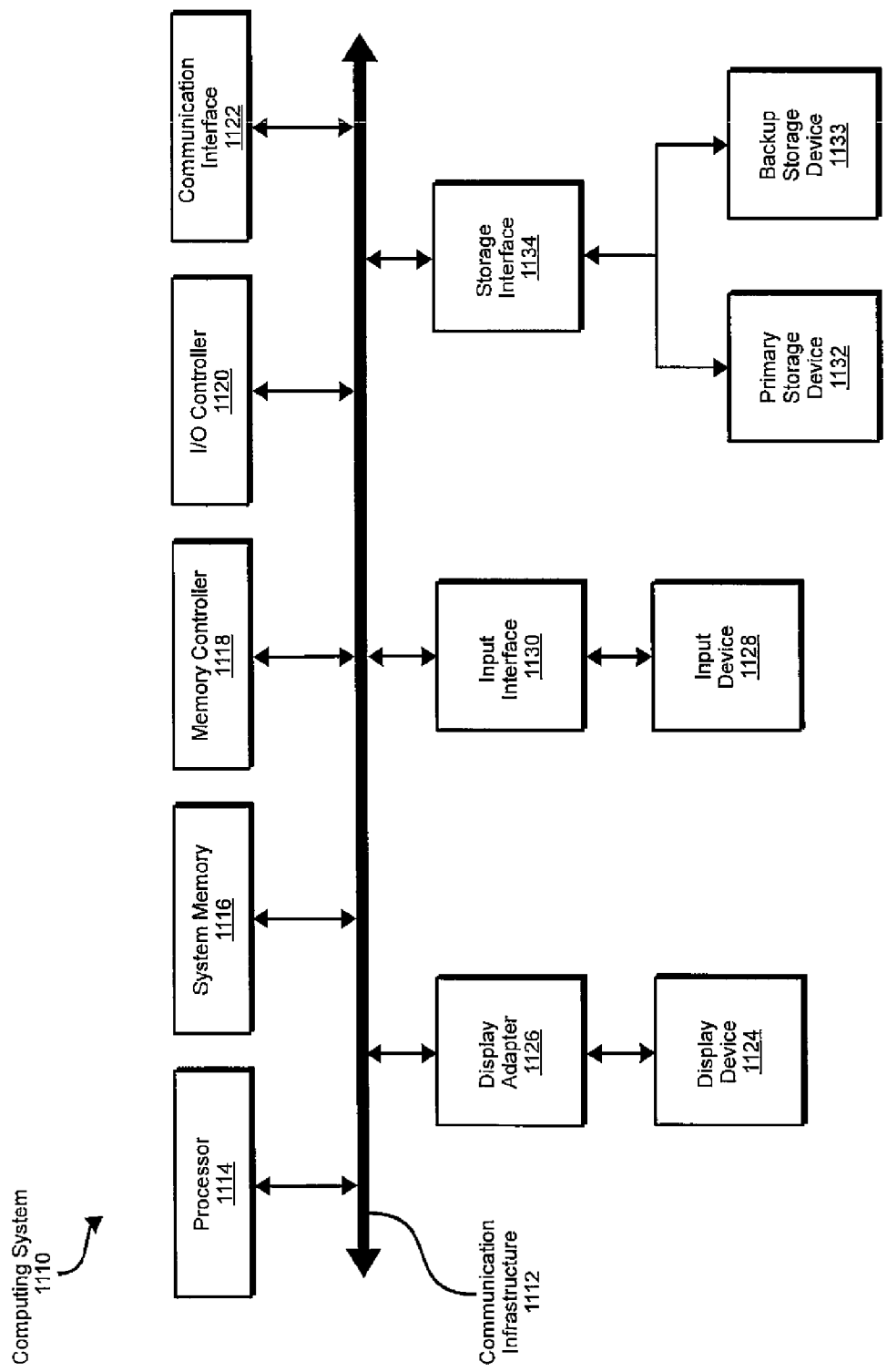
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing device 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller may perform and/or be a means for performing, either alone or in combination with other elements, one or more of the steps or features described and/or illustrated herein, such as receiving, identifying, associating, performing, polling, transferring, copying, reformatting, watermarking, backing up, issuing, running, synchronizing, uploading, providing, and determining.

I/O controller 1120 generally represents any type or form of module capable of coordinating and/or controlling the input and output functions of a computing device. For example, in certain embodiments I/O controller may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps disclosed herein. Communication interface 1122 may also be used to perform and/or be a means for performing other steps and features set forth in the instant disclosure.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

In certain embodiments, the exemplary file systems disclosed herein may be stored on primary storage device 1132, while the exemplary file-system backups disclosed herein may be stored on backup storage device 1133. Storage devices 1132 and 1133 may also be used, for example, to perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments descried and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Figure 12:
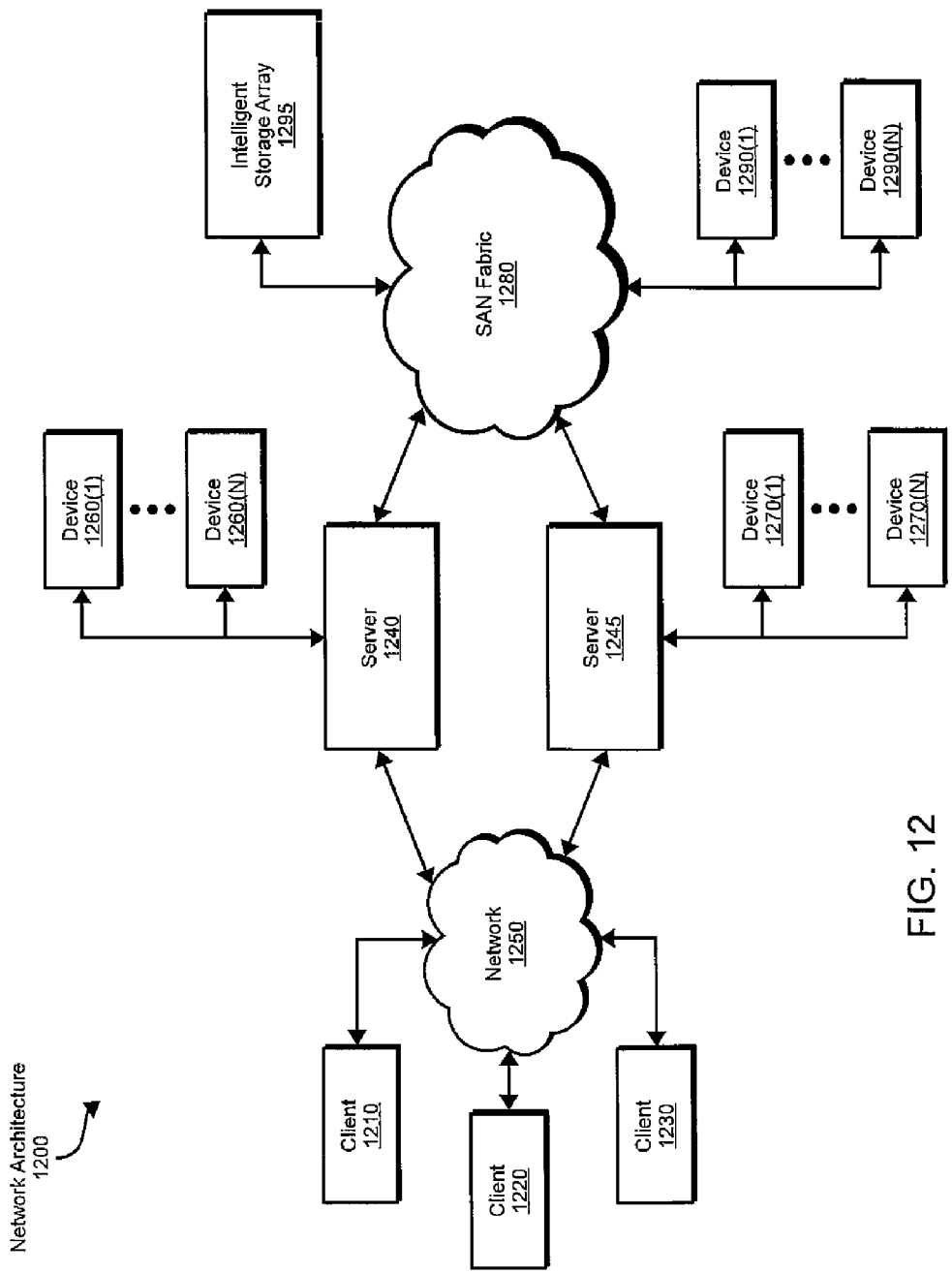
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or to run certain software applications. Network 1250 generally represents any telecommunication or computer network; including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1290(1)-(N) may be directly attached to server 1245. Storage devices 1260(1)-(N) and storage devices 1290(1)-(N) generally represent any type or form of storage device or medium capable of storing data and/or other computer-readable instructions. In certain embodiments, storage devices 1260(1)-(N) and storage devices 1290(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1250, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the receiving, identifying, associating, performing, polling, transferring, copying, reformatting, watermarking, backing up, issuing, running, synchronizing, uploading, providing, and determining steps disclosed herein. Network architecture 1200 may also be used to perform and/or be a means for performing other steps and features set forth in the instant disclosure.

For example, in certain embodiments the exemplary file systems disclosed herein may be stored on client systems 1210, 1220, and/or 1230. Similarly, the exemplary file-system backups disclosed herein may be stored on server 1240, server 1245, storage devices 1260(1)-(N), storage devices 1270(1)-(N), storage devices 1290(1)-(N), intelligent storage array 1295, or any combination thereof.

Computing system 1110, network architecture 1200, and/or the devices corresponding to computing system 1110 and network architecture 1200 may be programmed or otherwise configured to perform a method for associating a setting with a tag. The method may comprise identifying a tag. The tag may be associated with an object. The method may also comprise receiving a setting, associating the setting with the tag, and performing an action based on the setting, the action being performed with respect to the object.

In certain embodiments, identifying a tag may further comprise polling an object tagging system to identify the tag, receiving a notification that the tag was created, receiving the tag, or receiving information about the tag. Also, in one embodiment, the setting may comprise an access setting. According to certain embodiments, performing the action based on the setting, the action being performed with respect to the object, may comprise receiving a request to access the object and determining, based on the access setting, whether to permit access to the object. The method may further comprise receiving the tag from a user interface and associating the tag with the object.

In some embodiments, performing the action based on the setting may comprise transferring the object, copying the object, reformatting the object, watermarking the object, backing up the object, issuing a notification about the object, and/or running a script. In at least one embodiment, performing the action based on the setting may comprise copying the object from a first device on a network to a second device on the network. In various embodiments, performing the action based on the setting may comprise syncing the object to a peripheral device. Also, performing the action based on the setting may comprise uploading the object to a web site.

In at least one embodiment the object may comprise a digital file, a digital picture, a digital music file, a digital video file, a web page, a blog entry, an application, a module, a user-interface window, an internet bookmark, and/or a computing resource. In certain embodiments, the tag may comprise a human-readable tag created by an owner of the object. The tag may also describe a property of the object.

According to some embodiments, a computer-readable medium may comprise a first computer-executable instruction operable to identify a tag. The tag may be associated with an object. The computer-readable medium may also comprise a second computer-executable instruction operable to receive a setting, a third computer-executable instruction operable to associate the setting with the tag, and a fourth computer-executable instruction operable to perform an action based on the setting.

In various embodiments, the fourth computer-executable instruction may be operable to receive a request to access the object and determine, based on the access setting, whether to permit access to the object. According to some embodiments, the fourth computer-executable instruction may be operable to copy the object from a first device on a network to a second device on the network. Also, performing the action based on the setting, the action being performed with respect to the object, may comprise syncing the object to a peripheral device. In certain embodiments, performing the action based on the setting may comprise uploading the object to a web site.

Computing system 1110, network architecture 1200, and/or the devices corresponding to computing system 1110 and network architecture 1200 may be programmed or otherwise configured to perform a method for associating a tag with a module. In certain embodiments, the method may comprise receiving a tag from a user interface, identifying a module, and associating the tag with the module. The method may further comprise receiving a setting, associating the setting with the tag, and performing an action based on the setting, the action being performed with respect to the module. In various embodiments, performing the action based on the setting may comprise receiving a request to access the module and determining, based on the access setting, whether to permit access to the module. According to at least one embodiment, the method may further comprise receiving a request to create a tag for the module. In some embodiments the request may be sent by a user. The method may also comprise providing the user with the interface in response to the request.

In certain embodiments, associating the tag with the module may comprise associating the tag with a window. In at least one embodiment, the module may comprise a window. According to various embodiments, associating the tag with the module may comprise associating the tag with the window. In at least one embodiment, providing the user with the interface may comprise sub-classing the window.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

We claim:

1. A computer-implemented method comprising:
identifying a tag;
separately assigning the same tag to each of a plurality of software applications;
receiving an access control setting;
associating the access control setting with the tag, wherein the access control setting is associated with the tag after the tag is assigned to each of the plurality of software applications;
performing an action with respect to a software application from the plurality of software applications by applying the setting to the software application based on the tag being assigned to the software application, wherein:
performing the action comprises receiving a request to access the software application and determining, based on the access control setting, whether to permit access to the software application;
the method is performed by a computing device comprising at least one processor.

2. The computer-implemented method of claim 1, wherein:
the tag identifies a user;
the access control setting identifies at least one access control privilege of the user.

3. The computer-implemented method of claim 2, wherein:
the access control privilege of the user indicates that the user is allowed to use any software application to which the tag is assigned.

4. The computer-implemented method of claim 1, wherein:
associating the setting with the tag enables a user to permit and/or prohibit one or more other users from using the software application.

5. The computer-implemented method of claim 1, wherein:
the access control setting indicates that a first user is allowed to access the software application if the software application is tagged with the tag and with an additional tag.

6. The computer-implemented method of claim 1, wherein:
the access control setting indicates that a user only has limited access to software applications to which the tag is assigned.

7. The computer-implemented method of claim 1, further comprising:
identifying an additional access control setting that has a conflict with the access control setting;
resolving the conflict between the access control setting and the additional access control setting.

8. The computer-implemented method of claim 7, wherein resolving the conflict comprises:
defining priorities for the access control setting and the additional access control setting.

9. The computer-implemented method of claim 1, further comprising:
identifying an additional tag;
determining that the additional tag is not associated with any access control settings;
identifying a rule that indicates that tags that are not explicitly associated with any access control settings are implicitly associated with a no-access setting;
receiving a request to access an additional software application that is tagged with the additional tag;

denying access to the additional software application based on the implicit no-access setting.

10. The computer-implemented method of claim 1, further comprising:
retrieving the access control setting from an access-control-setting database upon receiving the request to access the software application.

11. The computer-implemented method of claim 1, wherein the tag comprises a name of a user who made the request to access the software application.

12. A non-transitory computer-readable storage medium comprising:
a first computer-executable instruction operable to identify a tag;
a second computer-executable instruction operable to separately assign the same tag to each of a plurality of software applications;
a third computer-executable instruction operable to receive an access control setting;
a fourth computer-executable instruction operable to associate the access control setting with the tag, wherein the access control setting is associated with the tag after the tag is assigned to each of the plurality of objects;
a fifth computer-executable instruction operable to perform an action with respect to a software application from the plurality of software applications by applying the setting to the software application based on the tag being assigned to the software application, wherein the fifth computer-executable instruction is operable to perform the action by receiving a request to access the software application and determining, based on the access control setting, whether to permit access to the software application.

13. The computer-readable medium of claim 12, wherein:
the tag identifies a user;
the access control setting identifies at least one access control privilege of the user.

14. The computer-readable medium of claim 13, wherein the access control setting indicates that the user is not allowed to access software applications tagged with the tag.

15. A computer-implemented method comprising:
receiving a tag from a user interface;
separately assigning the tag to each of a plurality of software modules;
receiving an access control setting;
associating the access control setting with the tag, wherein the access control setting is associated with the tag after the tag is assigned to each of the plurality of software modules;
performing an action with respect to a software module from the plurality of software modules by applying the setting to the software module based on the tag being assigned to the software module, wherein:
performing the action comprises receiving a request to access the software module and determining, based on the access control setting, whether to permit access to the software module;
the method is performed by a computing device comprising at least one processor.

16. The computer-implemented method of claim 15, wherein:
the software module comprises a subroutine of a software application;
separately assigning the tag to each of the plurality of software modules comprises separately assigning the tag to each of a plurality of subroutines.

17. The computer-implemented method of claim 15, wherein:
the software module comprises a user interface window;
separately assigning the tag to each of the plurality of software modules comprises assigning the tag to the user interface window.

18. The computer-implemented method of claim 15, further comprising:
receiving a request to create the tag for the software module, the request being sent by a user;
providing the user with the user interface in response to the request.

19. The computer-implemented method of claim 18, wherein:
the software module comprises a window;
assigning the tag to the software module comprises assigning the tag to the window;
providing the user with the interface comprises sub-classing the window.

20. The computer-implemented method of claim 19, wherein sub-classing the window comprises:
displaying a dialog sub-window, the dialog sub-window comprising the user interface from which the tag is received;
rerouting operating system communications from the window to the dialog sub-window.

* * * * *